United States Patent
Jordan, Jr. et al.

(10) Patent No.: US 8,510,013 B2
(45) Date of Patent: Aug. 13, 2013

(54) GAS TURBINE SHUTDOWN

(75) Inventors: Harold Lamar Jordan, Jr., Greenville, SC (US); David August Snider, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1136 days.

(21) Appl. No.: 12/434,755

(22) Filed: May 4, 2009

(65) Prior Publication Data

US 2010/0280733 A1    Nov. 4, 2010

(51) Int. Cl.
*F02C 9/00*  (2006.01)
*F02C 9/26*  (2006.01)
*F02C 9/48*  (2006.01)
*F02C 7/057* (2006.01)

(52) U.S. Cl.
USPC .......................................................... 701/100

(58) Field of Classification Search
USPC .......................................................... 701/100
See application file for complete search history.

(56) References Cited

U.S. PATENT DOCUMENTS

| | | | | |
|---|---|---|---|---|
| 4,117,670 | A | * | 10/1978 | Dombkowsi et al. ...... 60/39.281 |
| 4,151,712 | A | * | 5/1979 | Martens et al. ............ 60/39.281 |
| 5,857,321 | A | * | 1/1999 | Rajamani et al. ........... 60/39.27 |
| 5,896,736 | A | * | 4/1999 | Rajamani ........................ 60/773 |
| 6,253,537 | B1 | | 7/2001 | Suenaga et al. |
| 8,260,523 | B2 | * | 9/2012 | Singh et al. ................... 701/100 |
| 2004/0237535 | A1 | * | 12/2004 | Ainsworth ...................... 60/772 |
| 2005/0022499 | A1 | * | 2/2005 | Belokon et al. ............. 60/39.511 |
| 2010/0287944 | A1 | * | 11/2010 | Draper et al. ................... 60/772 |
| 2012/0232768 | A1 | * | 9/2012 | Nenmeni et al. .............. 701/100 |
| 2012/0285174 | A1 | * | 11/2012 | Hannula ........................ 60/773 |
| 2012/0324903 | A1 | * | 12/2012 | Dewis et al. .................... 60/772 |

FOREIGN PATENT DOCUMENTS

EP    0979933 B1    9/2004

* cited by examiner

*Primary Examiner* — Khoi Tran
*Assistant Examiner* — Dale Moyer
(74) *Attorney, Agent, or Firm* — Hoffman Warnick LLC; Ernest G. Cusick

(57) ABSTRACT

A gas turbine includes a rotor, and a controller for controlling a shutdown of the gas turbine based on a target fuel-to-air ratio profile and/or controlling a rotor speed according to a target speed schedule to attain a specified duration for the shutdown. The controller controls the rotor speed by engaging the starting system to turn the rotor.

17 Claims, 2 Drawing Sheets

GAS TURBINE SHUTDOWN

BACKGROUND OF THE INVENTION

The invention relates generally to gas turbine technology. More particularly, the invention relates to gas turbine shutdown using fuel-to-air ratio and/or rotor speed control.

Current approaches to gas turbine shutdown reduce fuel flow as a function of time. This process may be accomplished by determining a fuel flow at full speed of the turbine, and then reducing the fuel flow (F) over time (dF/dt)). Once the fuel flow and/or rotor speed is sufficiently low (e.g., 20% of full speed) for the particular turbine, the fuel flow is stopped, and the turbine decelerates to a minimum speed, completing the shutdown of the turbine.

One challenge posed by the above-described approach is that it leads to a large variation in shutdown behavior, which cannot be readily controlled. More specifically, shutting down a gas turbine by reducing fuel flow as a function of time does not ensure a direct relationship between fuel flow and the turbine's operating speed. Rather, significant variations in the rotor speed versus time result from differences in various losses, different turbine conditions, etc. The variation in rotor speed produces significant differences in the fuel-to-air ratio because air intake is a function of rotor speed, and fuel flow is not directly related to speed. Consequently, reducing fuel flow does not necessarily allow for control of how the turbine is operating. In particular, the uncontrolled and varying fuel-to-air ratios may result in variations in firing temperatures, exhaust temperatures and emission rates. This approach also renders a number of characteristics unpredictable such as the time it takes to decelerate from full speed to 'turning gear speed', i.e., the speed at which the rotor must be continually turned by an outside source so as to prevent bowing of the rotor. It also makes it difficult to accurately predict part life since the time and temperatures that the part is exposed to in actual operation varies. Additionally, the variation in shutdown behavior will have an effect on turbine clearances, and can result in additional conservatism in the required clearances and a resulting loss of gas turbine performance.

BRIEF DESCRIPTION OF THE INVENTION

A first aspect of the disclosure provides a gas turbine comprising: a rotor; and a controller for controlling a shutdown of the gas turbine to minimize shutdown variation by controlling at least one of: air flow, rotor speed or fuel flow.

A second aspect of the disclosure provides a gas turbine comprising: a rotor; a generator including a starting system coupled to the rotor for powered turning of the rotor; and a controller for controlling a rotor speed according to a target speed schedule to attain a specified duration for a shutdown of the gas turbine, the controller controlling the rotor speed by engaging the starting system to turn the rotor.

A third aspect of the disclosure provides a method comprising: controlling a shutdown of a gas turbine by controlling at least one of: an air flow to attain a target fuel-to-air ratio profile, a fuel flow to attain a target fuel-to-air ratio profile, or a rotor speed according to a target speed schedule configured to attain a specified duration for the shutdown.

DETAILED DESCRIPTION OF THE INVENTION

Figure 1:
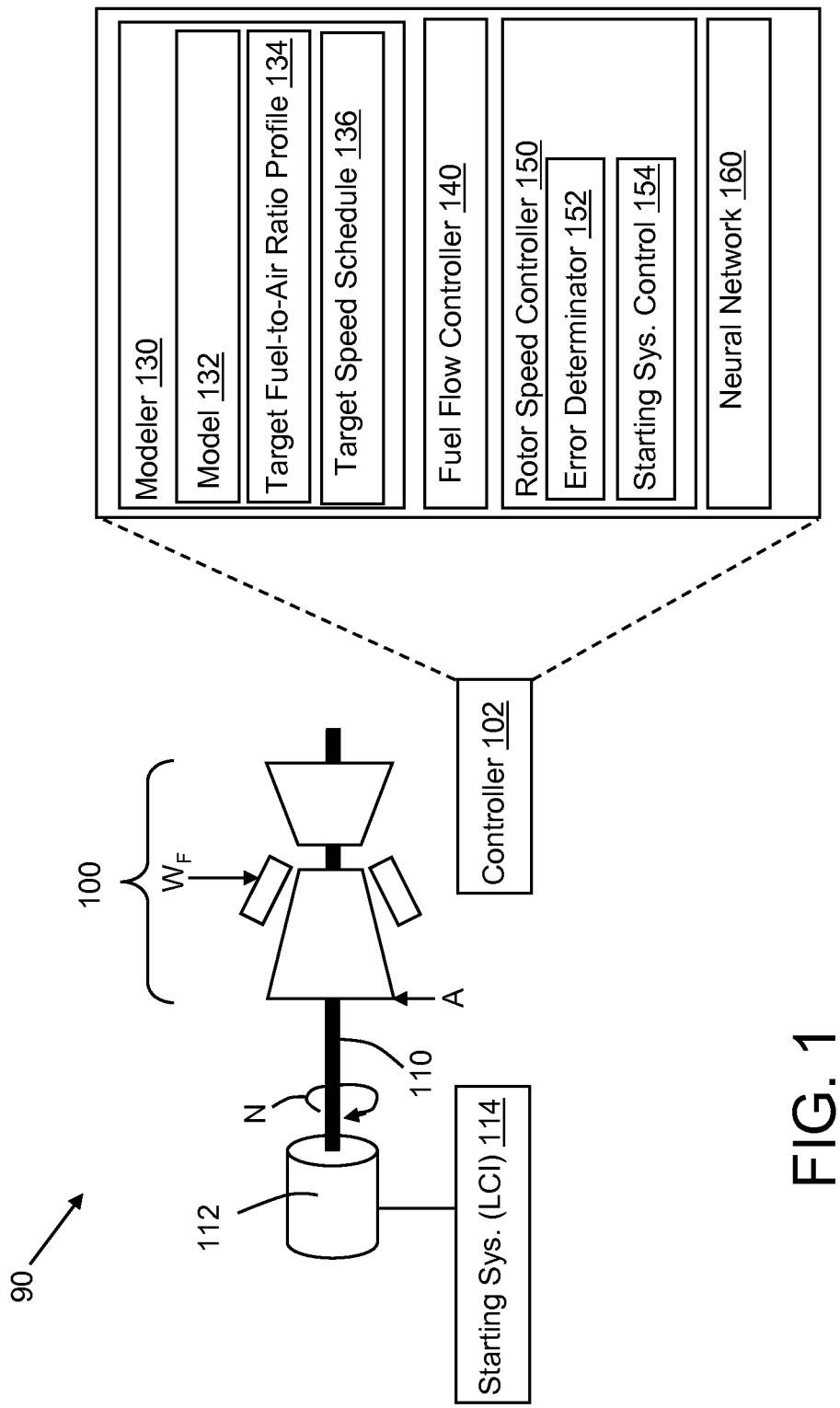
FIG. 1 shows a schematic diagram of a relevant part of a power plant according to embodiments of the invention.

Referring to FIG. 1, a power plant 90 including a controller 102 according to embodiments is illustrated. Power plant 90 includes a gas turbine 100. Gas turbine 100 may include any now known or later developed gas turbine. Gas turbine 100 turns a rotor 110 by burning a fuel such as natural gas. Rotor 110 is coupled to a generator 112 that generates electric power from the turning of rotor 110. Generator 112 may include any now known or later developed generator that includes a starting system 114 such as a motor, a load commutating inverter (LCI) or similar structure for applying an external torque to rotor 110. As understood, starting system 114 is coupled to rotor 110 and configured to reverse the operation of generator 112 for powered turning of rotor 100. If an LCI is used, in simplified terms, it turns generator 112 into a motor.

Controller 102 may include any now known or later developed control system for controlling practically all parts of power plant 90, e.g., gas turbine 100, generator 112, starting system 114, control valves, fuel flow, air flow, etc. Further, according to embodiments of the invention, controller 102 controls a shutdown of gas turbine 100 to minimize shutdown variation by controlling at least one of: air flow, rotor speed or fuel flow. This is in contrast to conventional techniques that simply reduce fuel flow as a function of time, i.e., they do not control fuel flow to meet any other system requirements. Controller 102 can control the shutdown to optimize any of a large variety of parameters such as cycle temperatures, emission rates, part life, clearances, shutdown duration, etc.

In one embodiment, controller 102 controls the shutdown based on a target fuel-to-air ratio profile. In this case, controller 102 may control an air flow A or fuel flow $W_F$ to attain the target fuel-to-air ratio profile, which is based on a model configured to attain an optimized shutdown. Air flow A can be controlled, in part, by controlling air intake vanes within turbine 100, and fuel flow $W_F$ can be controlled, in part, by controlling, for example, a fuel pump (not shown). In another embodiment, controller 102 controls the shutdown by controlling a rotor speed N according to a target speed schedule to attain a specified duration for the shutdown. In this case, controller 102 controls rotor speed N by engaging starting system 114 to turn the rotor, i.e., either increasing or decreasing its speed N to comply with the target speed schedule.

The above-described embodiments may be used separately, or may be used together. That is, controller 102 controls at least one of: air flow A and/or fuel flow $W_F$ to attain the target fuel-to-air ratio profile 134 based on a model 132, and/or rotor speed N according to a target speed schedule 136 configured to attain a specified duration for the shutdown.

Structurally, controller 102 may include any form of computerized control system conventionally used for controlling power plant 90 regardless of whether it takes form as hardware, software or a combination thereof. In this regard, it is understood that controller 102 may include a large variety of different functions for controlling power plant 90 that are not shown for clarity purposes. In accordance with embodiments of the invention, controller 102 is also configured to provide the above-described shutdown techniques. In order to achieve these functions, controller 102 may include a modeler 130 including any now known or later developed system for modeling which may include an on-board cycle model, simplified correlations (OCMSC) system such as an advanced real time engine simulator (ARES) to model hard to measure parameters such as firing temperature. Model 132 may include a target fuel-to-air ratio profile 134 and a target speed schedule 136. Controller 102 further may include a fuel flow controller 140, a rotor speed controller 150 that may include an error determinator 152 and a starting system control 154, and a neural network 160.

In operation, modeler 130 models operation of a particular gas turbine 100 to formulate target fuel-to-air ratio profile 134. In one embodiment, modeler 130 models the operation so as to minimize shutdown variation. Target fuel-to-air ratio profile 134 includes a schedule of desired fuel-to-air ratios over a period of time, which if followed, will attain the desired profile. Modeling of the fuel-to-air ratio is desirable to improve accuracy of the control. However, the fuel-to-air ratio can be estimated in a known fashion based on other parameters such as fuel flow $W_F$, compressor discharge pressure, inlet pressure drop, exhaust temperatures, etc. If necessary, the fuel-to-air ratio may be normalized over a range of temperatures using modeler 130.

In one embodiment, in order to implement target fuel-to-air ratio profile 134, fuel flow controller 140 of controller 102 controls air flow A and/or fuel flow $W_F$ (increasing or decreasing A and/or $W_F$ as necessary) as a function of rotor speed N. Fuel flow controller 140 may command any of a large of number of valves, vanes, pumps, etc., that determine air flow A and/or fuel flow $W_F$. Control of other parameters may also be employed, where necessary. Control of the shutdown based on the fuel-to-air ratio profile more precisely controls the shutdown compared to conventional techniques that simply reduce fuel flow $W_F$ and allow the gas turbine's operation to otherwise drift uncontrollably. Consequently, cycle temperatures, emission rates, part life, clearances, etc., can be better controlled.

In another embodiment, modeler 130 models operation of a particular gas turbine 100 to formulate a target speed schedule 136, i.e., a schedule of desired rotor speed N over a period of time. Target speed schedule 136 may be configured to attain a specified duration for the shutdown. Controller 102 controls rotor speed N during shutdown by engaging starting system 114 to turn rotor 110. In most cases, controller 102 would mandate physically decreasing the deceleration of rotor 110; although, increasing the deceleration rate or increasing the speed of rotor 110 may also be desirable depending on what is being optimized. Control of the duration of the shutdown in this manner provides greater predictability in the time it takes to decelerate from full speed to 'turning gear speed'. This type of control also makes it easier to accurately predict part life due to better control of the exposure of the part to thermal and mechanical loads.

Figure 2:
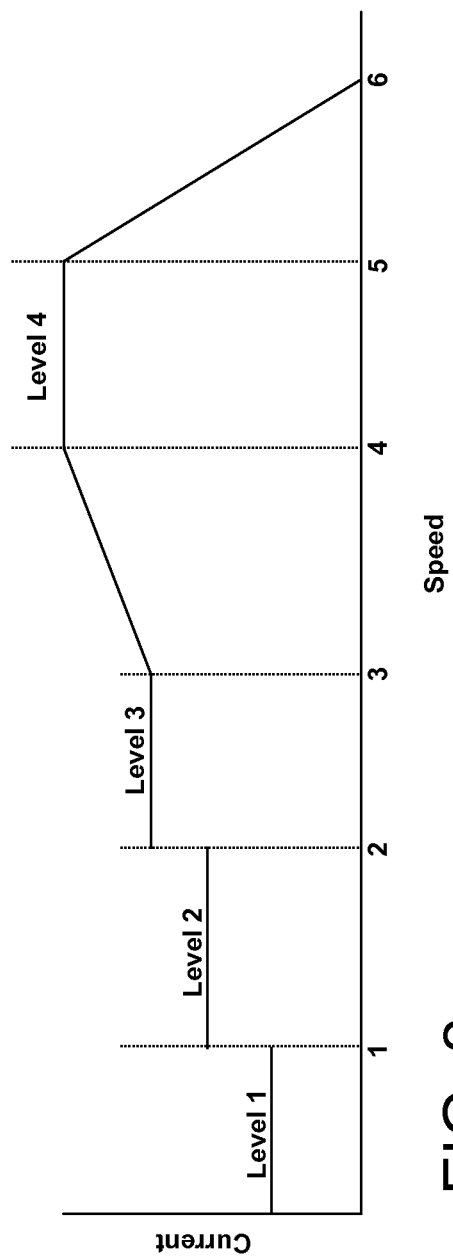
FIG. 2 shows a load commutating inverter (LCI) nominal speed versus current schedule.

This technique can be readily introduced into conventional starting system 114 (LCI) control schemes. In particular, rotor speed controller 150 via starting system control 154, which may be part of starting system 114, may control a torque output of starting system 114 according to a nominal starting system schedule configured to attain the target speed schedule. As understood, the torque output of starting system 114 powers the turning of rotor 110. An illustrative nominal starting system schedule is shown in FIG. 2 as current input to starting system 114 (LCI) versus speed. Error determinator 152 of rotor speed controller 150 may determine an error $N_{err}$ between an actual speed N of rotor 110 and a target speed $N_{Targ}$ from target speed schedule 136, i.e., at a specified time of the shutdown. Rotor speed N may be measured using any now known or later developed solution, e.g., infrared sensors, etc. Rotor speed controller 150 controls starting system 114 via starting system control 154 by powering the turning of rotor 110 to correct for the error $N_{err}$. Rotor speed controller 150 may implement the correction by introducing a current scaler to whatever portion of the nominal starting system schedule (FIG. 2) is appropriate. Where necessary, the starting system current scaling performed by rotor speed controller 150 may include a rate limit to regulate the scale by which current is changed, and may include a clamp to dictate the maximum amount by which the current can be changed.

In addition to the above-described operation, a neural network 160 may be employed to improve shutdown control based on historical performance. Neural network 160 may employ any now known or later developed artificial intelligence or numerical techniques. In one embodiment, neural network 160 may be used to adjust model 132 including target fuel-to-air ratio profile 134 and/or target speed schedule 136 based on historical performance. In addition, either profile may also be adjusted to optimize certain shutdown characteristics such as cycle temperatures, emission rates, part life, clearances, etc.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gas turbine configured to connect to a power plant, the gas turbine comprising:
   a rotor; and
   a controller for controlling a shutdown of the gas turbine to minimize shutdown variation by controlling at least one of: air flow, speed of the rotor or fuel flow, the controller including a modeler configured to generate a model of operation of the gas turbine,
   wherein the model includes a fuel-to-air ratio profile for the gas turbine.

2. The gas turbine of claim 1, wherein the controller controls the shutdown based on a target fuel-to-air ratio profile generated by the modeler.

3. The gas turbine of claim 2, further comprising a neural network that adjusts the target fuel-to-air ratio profile based on historical performance,
   wherein the controller is configured to control turbine operation by controlling air flow to the gas turbine.

4. The gas turbine of claim 3, wherein the controller controls the air flow to the gas turbine by manipulating a set of air intake vanes.

5. The gas turbine of claim 1, wherein the controller controls the fuel flow as a function of the speed of the rotor.

6. The gas turbine of claim 1, further comprising a generator including a starting system coupled to the rotor for powered turning of the rotor, wherein the controller controls the speed of the rotor during the shutdown by engaging the starting system to turn the rotor.

7. The gas turbine of claim 6, wherein the starting system includes a load commutating inverter (LCI).

8. The gas turbine of claim 1, wherein the controller controls the speed of the rotor according to a target speed schedule to attain a specified duration for the shutdown, wherein the target speed schedule is generated by the modeler and the controller controls the speed of the rotor via a starting system.

9. The gas turbine of claim 8, wherein the controller controls the speed of the rotor by:

controlling a torque output of the starting system according to a nominal starting system schedule configured to attain the target speed schedule;

determining an error between an actual speed of the rotor and the target speed schedule; and controlling the torque output of the starting system to correct for the error.

10. A gas turbine comprising:

a rotor;

a generator including a starting system coupled to the rotor for powered turning of the rotor;

a modeler communicatively connected to the rotor and configured to generate a model of operation of the gas turbine which includes a target fuel-to-air ratio profile for the gas turbine; and a controller for controlling shutdown of the gas turbine, the controller configured to control an air flow to the gas turbine according to the target fuel-to-air ratio profile, and to control a speed of the rotor according to a target speed schedule to attain a specified duration for a shutdown of the gas turbine, the controller controlling the speed of the rotor by engaging the starting system to turn the rotor.

11. The gas turbine of claim 10, wherein the controller further controls the shutdown based on a target fuel-to-air ratio profile.

12. The gas turbine of claim 10, further comprising a neural network connected to the modeler and configured to adjust the model of operation of the gas turbine based on historical performance of the gas turbine.

13. The gas turbine of claim 12, wherein the neural network adjusts the target fuel-to-air ratio profile based on historical performance.

14. The gas turbine of claim 10, wherein the controller controls the speed of the rotor by:

generating a nominal starting system schedule to attain a desired deceleration profile for the speed of the rotor;

determining an error between an actual speed of the rotor and the target speed schedule; and controlling a torque output of the starting system to correct for the error.

15. The gas turbine of claim 10, further comprising a set of air intake valves disposed within the gas turbine for adjusting the air flow to the gas turbine.

16. A method comprising:

modeling operation of a gas turbine to generate a target fuel-to-air ratio profile; and controlling a shutdown of the gas turbine by controlling at least one of:

an air flow to the gas turbine to attain the target fuel-to-air ratio profile, a fuel flow to the gas turbine to attain the target fuel-to-air ratio profile, or a speed of a rotor of the gas turbine according to a target speed schedule configured to attain a specified duration for the shutdown, wherein the rotor speed controlling includes:

generating a nominal starting system schedule to attain a desired deceleration profile for the speed of the rotor;

determining an error between an actual speed of the rotor and the target speed schedule; and controlling a torque output of a starting system connected to the gas turbine to correct for the error.

17. The method of claim 16, further comprising providing a neural network, and using the neural network to adjust at least one of the target fuel-to-air ratio profile and the target speed schedule after the modeling of operation of the gas turbine based on historical performance, wherein the controlling includes adjusting an air flow to the gas turbine, the adjusting the air flow includes manipulating a set of air intake vanes.

* * * * *